US008789277B1

(12) United States Patent
Phillips

(10) Patent No.: US 8,789,277 B1
(45) Date of Patent: Jul. 29, 2014

(54) METHOD FOR PRODUCING A STATIC RESISTANT SYNTHETIC INTER-CONNECTABLE STRUCTURAL MAT

(75) Inventor: Mark L. Phillips, Lafayette, LA (US)

(73) Assignee: HB Green Resources, LLC, Lafayette, LA (US)

( * ) Notice: Subject to any disclaimer, the term of this patent is extended or adjusted under 35 U.S.C. 154(b) by 413 days.

(21) Appl. No.: 13/163,158

(22) Filed: Jun. 17, 2011

(51) Int. Cl.
 *B21D 53/88* (2006.01)
(52) U.S. Cl.
 USPC ....................................... 29/897.2
(58) Field of Classification Search
 CPC ........... B65D 2519/00273; B65D 2519/00293; B65D 19/0002; B65D 19/0004; E02B 17/021; E01C 9/086
 USPC ....................................... 29/897.2
 See application file for complete search history.

(56) References Cited

U.S. PATENT DOCUMENTS

| 5,298,540 | A | * | 3/1994 | Pauquet et al. | 524/94 |
| 5,316,408 | A | * | 5/1994 | Stanley et al. | 404/35 |
| 6,380,309 | B1 | | 4/2002 | Parker et al. | |
| 2002/0188074 | A1 | * | 12/2002 | Parker et al. | 525/166 |
| 2007/0258765 | A1 | * | 11/2007 | Coyle et al. | 404/19 |

OTHER PUBLICATIONS http://www.maropolymeronline.com/properties/HDPE%20prop.asp (2002).*
Handbook of Plastics Recycling, Francesco La Mantia, ISBN 1-85957-325-8, 2002, p. 229.*

* cited by examiner

*Primary Examiner* — David Bryant
*Assistant Examiner* — Moshe Wilensky
(74) *Attorney, Agent, or Firm* — Buskop Law Group, PC; Wendy Buskop

(57) ABSTRACT

A method of producing a static resistant synthetic inter-connectable structural mat which can support vehicles, heavy equipment, drilling rigs with static charge resistance, resistance to corrosive materials, and an ability to be transported using conventional trucks on conventional roadways without a special permit, using polyethylene particles; polyethylene terephthalate particles, styrene-butadiene rubber particles; antistatic particles for preventing static charge buildup, wherein the antistatic particles have a diameter from about 1/16 of an inch to about 1/4 of an inch to allow for partial protrusion through a formed outer surface; and an ultraviolet stabilizer material.

16 Claims, 4 Drawing Sheets

METHOD FOR PRODUCING A STATIC RESISTANT SYNTHETIC INTER-CONNECTABLE STRUCTURAL MAT

FIELD

The present embodiments generally relate to a method of producing static resistant synthetic inter-connectable structural mats made from recycled plastics and rubber.

BACKGROUND

A need exists for a method of producing a static resistant synthetic inter-connectable structural mat that uses recycled plastics and recycled rubber to create a smaller carbon footprint.

The present embodiments meet these needs.

BRIEF DESCRIPTION OF THE FIGURES

The detailed description will be better understood in conjunction with the accompanying drawings as follows.

Figure 1:
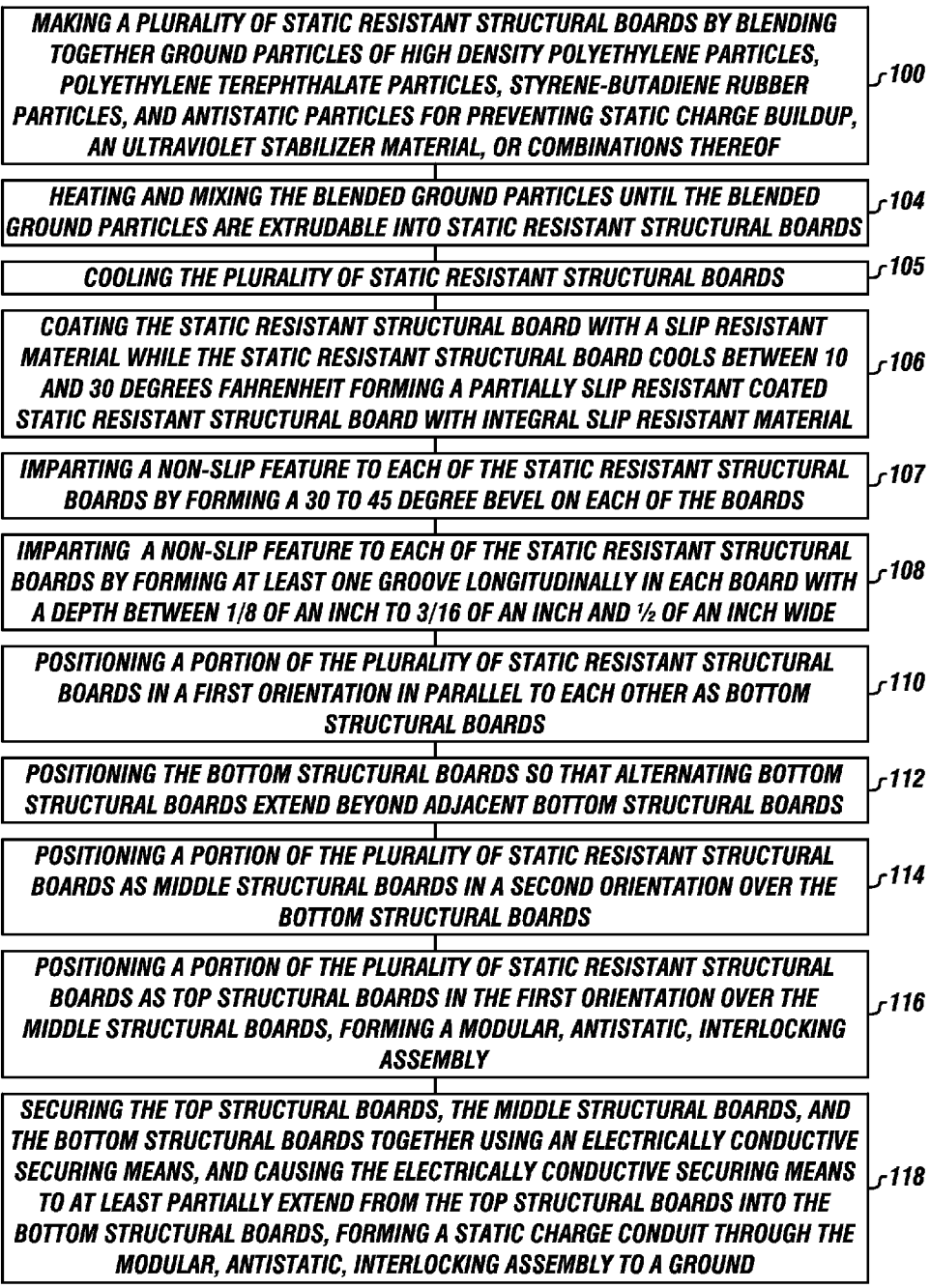
FIG. 1 is a flow chart of an embodiment of the method.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method of producing static resistant synthetic inter-connectable structural mats.

The method can be a batch method to make structural boards, or a continuous method to make structural boards, and then a sequence of steps to create in a factory setting, modular, static resistant structural mats that can withstand at least 1000 pounds of load and up to 20 tons of load without deforming.

Static electricity in one form or another is a phenomenon of nature and often results in electrostatic discharges that can cause fires and explosions.

Improved static resistant mats are needed for the oil and gas drilling industry to reduce static charge buildup on the surface of such mats in association with the derrick, the drilling structure or pipeline equipment.

The present embodiments provide a method for forming a structural mat that can be used beneath drilling rigs, which has reduced static charge buildup while using recycled bottles, such detergent bottles like TIDE™ bottles to form a portion of the structural boards used to make the unique mats.

Handling of traditional "built in place" mats rather than factory assembled mats has been very expensive. The present embodiments not only addresses the static charge issues for drilling rigs and facilities but can also provide a lower cost by providing a factory built structure that can be simply slide into place, rather than a built in place structure.

The method can create a mat that can be factory built and transported without the need for additional permits by a truck, and the mats can be interconnected without the need of screws or other tools in the field, to create an interconnected support structure.

The method can create a structural mat that is designed to allow a unique interlocking of the mats so that no "in the field" expertise is required and that no "in the field" welding, adhesives or fasteners are needed.

The method can create structural mats with a unique surface that allows static resistant material to protrude in segments of the outer surface, which can effectively prevent stray electrical currents.

In embodiments, the method can include a series of steps which can allow many mats to be created in a factory setting using counter sunk lag screws that additionally can improve increased static electricity dissipation to the ground from the top layer of the mat.

The factory process can allow more mats to be built at high speed, which is a significant cost saving on labor as compared with field built mats, such as for drilling and production operations.

The method can use lag screws which are believed to be conductive at each location, allowing a decentralized and continuous dissipation of electrical charge while preventing the mats from falling apart.

The method can create structural mats which can support between 1000 pounds and 20 tons when the structural mats use structural boards from about 1.5 inches to about 2 inches in thickness.

In an embodiment, the mats can each have a non-skid coating disposed on at least the top layer in either a continuous or a discontinuous manner to prevent slip and fall accidents.

Additionally the mats can have a non-skid coating by forming one or more grooves longitudinally in each board with a depth from about ⅛ of an inch to about 3/16 of an inch and from about ½ of an inch to about ¾ of an inch wide.

In another embodiment, the mats can have as a non-slip feature, a 30 to 45 degree bevel formed on each of the boards.

In embodiments of the method, the mats including a beveling or a non-slid material can help 1 and based rig workers, production crews and similar workers to stay on the rig or site, and not fall and slip on oil or fluids that escape into the surface of the mat, thereby preventing broken bones, preventing concussions, and other lost time accidents which can require medical treatment.

By using difficult to degrade materials, such as recycled tire material and detergent bottles, the mats made by this method can have a lower fossil fuel footprint.

By using recycled tire material and detergent bottles in the formulation of the mats, the mats can use material that has been removed from the waste stream and otherwise could end up in creeks, on beaches creating trash and litter.

The method reformulates the detergent bottles and tires which are difficult to use and can transform these materials into a usable product that protects the environment from ground water contamination, because the mats are typically disposed over a liner that prevent environmental spills.

The method can be used to create mats that form temporary roadways. No tar, bitumen, or additional oil is needed to make the temporary roads created with these structural mats, and accordingly, the temporary roads can also be removed.

The mats can be used in hurricane areas after a storm, when roads have been damaged to provide roadways for emergency vehicles and to help disaster survivors when no road building would be possible.

In an embodiment, the method can be a continuous method of producing static resistant synthetic inter-connectable structural boards to then create the three-layered mats which can support vehicles, heavy equipment, drilling rigs while simultaneously providing static charge resistance, resistance to corrosive materials, and an ability to be transported using conventional trucks on conventional roadways.

The method can involve forming mats using a sequence of steps that involve forming a blend of ground particles.

The blend of ground particles can include up to about 92 percent by weight based on the total blend of ground plastic particles.

The ground plastic particles can have diameters ranging from about 1/16 of an inch to about 1/4 of an inch. The ground plastic particles can be blends of high density polyethylene (HDPE) particles and with polyethylene terephthalate particles or blends of low density polyethylene (LDPE) particles with high density polyethylene with polyterephalate.

The blend ratio of HDPE or combinations of HDPE and LDPE to polyethylene terephthalate particles can range from 10:1 to 1:10.

To the ground plastic particles, from about 0.5 percent by weight to about 3.9 percent by weight of styrene-butadiene rubber particles based on the total blend can be used.

The ground styrene-butadiene rubber particles can have a diameter from about 1/16 of an inch to about 1/4 of an inch. The ground styrene-butadiene rubber can come from tires, which can be cut using a high shear cutting device, such as a continuous feed high speed cutter.

To the blend of ground styrene-butadiene with ground plastic particles, non-degrading antistatic particles can be added from about 2 percent by weight to about 10 percent by weight based of the total blend, which can be used for preventing static charge buildup in the resultant structural boards. Carbon black can be used for lowering the static charge buildup.

The non-degrading antistatic particles can have a diameter from about 1/16 of an inch to about 1/4 of an inch.

To the blend of ground styrene-butadiene, ground plastic particles with non-degrading antistatic particles, an ultraviolet stabilizer material can be added from about 0.5 percent to about 5 percent by weight based on the total blend.

The ultraviolet stabilizer material can have a diameter from about 1/16 of an inch to about 1/4 of an inch. The resultant formulation can be referred to herein as the "total blend."

The total blend can then be placed into an extruder, such as a single screw banbury type extruder for heating and mixing using a temperature from about 200 degrees Fahrenheit to about 385 degrees Fahrenheit until a homogenous mixture is created as the extrudate.

The extruder heats and mixes until the blend of ground particles are extrudable into a static resistant structural board, which can have the antistatic material partially protruding through an outer surface of the static resistant structural board.

The antistatic particles can be blended and randomly connected to each other which unexpectedly facilitates dissipation of static charge buildup in the structural boards, creating a density of at least 10 particles per square inch. The extrudate can dissipate voltage when the voltage is from about $10^{-5}$ volts to about $10^{-12}$ volts.

In one or more embodiments, the antistatic particles can be dissipaters that prevent static electrical buildup and maintain a voltage dissipation at or below $10^{-11}$ volts.

While the structural boards have a shape but are still warm, the structural boards can then be coated with a slip resistant coating to ensure integration of the slip resistant coating into the top surface rather than simply coating on the top surface.

The static resistant board can be at least partially coated in an embodiment with the slip resistant material. Nylon, low density polyurethane, and ethylene vinyl acetate (EVA) can be used as the slip resistant material and can also be static resistant material. In an embodiment, the nylon (a polyamide) and the EVA can be blended in equal amounts.

The thickness of the slip resistant material can range from about 1/16 of an inch to about 3/16 of an inch into the extrudate.

In another embodiment, the structural boards can have a bevel formed on one of the edges. The bevel, in this embodiment, can act as a non-slip feature. The bevel can be a 30 to 45 degree sloping face on one side of each of the formed structural boards.

In an embodiment, the coating can be deposited at least partially, such as from about 50 percent to about 75 percent of the surface area, while the static resistant structural board cools about 10 degrees to about 30 degrees Fahrenheit from the temperature coming out of the extruder, forming a partially slip resistant coated static resistant structural board with integral slip resistant material.

In another embodiment, the still warm structural board can be kept at a temperature from about 200 degrees Fahrenheit to about 385 degrees Fahrenheit and then coated with the slip resistant material forming a partially slip resistant coated static resistant structural board.

In an embodiment, the thickness of the slip resistant coating can range from about 1/16 of an inch to about 3/16 of an inch. In another embodiment, the slip resistant coating can be from about 0.01 percent by weight to about 6 percent by weight of the total weight of the partially slip resistant coated static resistant structural board.

After the structural board is formed, the structural board can then be cooled, such as in a water bath, or a bath of a liquid that is not harmful to the environment, in the case of a spill.

The next step of the method can involve using a plurality static resistant structural boards and forming a layer of these boards, termed "bottom boards" in a jig or in a form which is also referred to herein as a fixture.

The bottom boards can have a length and width which enables the resultant mat to be transported by truck over a roadway without the need to special permits.

The bottom boards can each have a length from about 4 feet to about 12 feet to be usable herein. The bottom boards can be placed parallel with each other in the jig, which can also be referred to herein as a fixture.

In an embodiment, the bottom boards can be spaced apart from about 1/4 of an inch to about 1/2 of an inch.

In embodiments, at least 3 bottom boards and up to 5 bottom boards can be positioned to extend beyond a perimeter of the jig, to create at least 3 and up to 5 spaces in the bottom boards for engagement with a fork lift or with another mat.

The bottom boards can be positioned in a first direction termed herein "a first orientation".

Positioned over these bottom boards are middle boards, which can have the same formulation and can be formed in the same manner as the bottom boards.

The middle boards can be positioned in a second orientation, such as at a 90 degree angle from the first orientation of the bottom boards.

In another embodiment, the second orientation can be on a bias, such as an angle from about 30 degrees to about 50 degrees.

The middle boards can be positioned in parallel to each other and spaced in a similar spacing as the bottom boards, which can range from about 1/2 of an inch to about 1/8 of an inch.

The middle boards do not cover the extending portion of the extending bottom boards.

Top boards can be positioned over the middle boards. Top boards can be made of the same formulation as the bottom and middle boards. The top boards can be positioned in the first orientation parallel with the bottom boards.

In an embodiment, the top boards can be positioned parallel to each other and spaced apart from about ¼ of an inch to about 1 inch.

The top boards can cover all the middle boards and do not cover the extending portion of the extending bottom boards.

A mat perimeter can be formed when the three layers of structural boards are positioned over each other.

The next step of the method can involve using lag screws to secure the structural boards together.

In embodiments, from about 10 lag screws and bolts to about 20 lag screws and bolts can be used per board. The lag screws and bolts can be used to totally penetrate the top structural boards, the middle structural boards to partially extend into the bottom structural boards and thereby provide a static charge conduit through the formed mat from the top surface of the mat. In an embodiment, the lag screws can be metal.

The layered structure with antistatic material protruding through the surface of the structural boards, the plurality of openings and extensions for providing a secure interlock with other boards without the need for additional tools or materials, and the lag screws extending from the top structural boards, through the middle structural boards and partially into the bottom structural boards forms a static resistant synthetic inter-connectable structural mat.

These formed mats whether interlocked or not, can support vehicles, heavy equipment, drilling rigs with static charge resistance, resistance to corrosive materials, and have the ability to be transported using conventional trucks on conventional roadways.

In embodiments, the mats can use structural boards that can be from about 4 feet to about 12 feet long, from about 5 inches to about 9 inches wide, and from about 1.5 inches to about 2 inches thick.

In an embodiment, the method can use a slip resistant coating to create the mats, that can be deposited in discontinuous portions on the outer surface of the partially slip resistant coated static resistant structural member.

In an embodiment, the method can use the slip resistant material to create the mats, wherein the slip resistant material can be a silica based material, such as sand, a crumb rubber, a polyamide blended with ethyl vinyl acetate in equal amounts, provided that none of these material have a particulate with a diameter larger than about ⅛ of inch to about 1/16 of an inch. Combinations of these materials can also be used to create the mats.

In an embodiment, the method can use the structural boards to create the mat, wherein the structural boards can be arranged in a fixture with the bottom layer having a bottom perimeter.

In an embodiment, from about 9 structural boards to about 12 structural boards can be used in the bottom layer. The bottom layer members can be positioned in a fixture in a first orientation, termed herein a "longitudinal" orientation, and the bottom layer can create a perimeter.

In an embodiment, three alternating board members of the bottom layer members can be positioned to extend at from about 12 inches from the bottom perimeter to provide a male mating portion for this first bottom layer with a female mating portion of a bottom layer of another mat. This male/female mating can allow for engagement in the field of the mats without using tools or special training.

In the fixture, middle structural boards can be positioned in a second orientation.

In this embodiment, the middle layer can use from about 15 parallel static resistance structural boards to about 20 parallel static resistance structural boards, wherein each middle structural member can be from about 7 feet to about 8 feet long. This length can allow the mats to be transported by truck without the need for special permits.

The middle layer in this embodiment can have the structural board members oriented at about a 90 degree orientation to the bottom layer first orientation. A top layer of the structural board members can be positioned over the middle layers, again in the first orientation.

The next step of this embodiment of the method can involve positioning a top layer of structural board members again in the first orientation, in the fixture over the middle layer.

The top layer can use from about 9 parallel static resistance structural members to about 13 parallel static resistance structural members. These members can be spaced apart up to about ¼ of an inch apart.

In an embodiment, the board members in the top layer can be flush against each other with no gap.

As part of the method, pilot holes can be formed, such as by drilling, in the top layer, the middle layer and partially through the bottom layer. The diameter of the pilot holes can range from about ⅛ of an inch to about ¾ of an inch.

The lag screws can be positioned through the pilot holes. The lag screws can be counter sunk in each pilot hole to a depth from about 1/16 of an inch to about 3/16 of an inch. Once the lag screws are sunk into the pilot holes, the formed three-layered mat with extensions and openings can then be removed from the fixture.

In an embodiment, a mat can be formed by the method having a bottom layer of about 11 boards to about 12 boards with at least a ½ inch gap between boards.

In another embodiment, the bottom layer can have from about 9 structural members to about 12 structural members, wherein the structural members can all be parallel, and can also include a fixture. Each of the structural members can be a static resistant structural member from about 9 feet to about 12 feet in length.

The structural members can be positioned in the fixture at a first orientation or a "longitudinal" orientation and the bottom layer can create a bottom perimeter.

A middle layer of structural members can then be positioned in a second orientation in the fixture, overlaying the bottom layer.

The middle layer can use from about 15 structural board members to about 20 structural board members, wherein each structural board member can be parallel to the other, and each static resistance structural members can be from about 6 feet to about 8 feet in length.

This embodiment of the method can involve positioning again in the first orientation in the fixture, a top layer, which can use from about 9 structural board members to about 14 structural board members, which can be parallel to each other and can be placed over the middle layer. In each layer the structural board members can be static resistant structural members as described above, in which the formulation can contain from about 10 percent to about 50 percent by weight of ground plastic particles and from about 50 percent to about 80 percent by weight of ground styrene-butadiene rubber particles.

In this embodiment, an upper L-shaped lip can be formed at one longitudinal end of the bottom layer and a lower opposing L-shaped lip can be formed at the opposite longitudinal end of the top layer.

These lips can be formed by attaching to extended structural members from the perimeter, a lip edge particularly, attaching an upper L-shaped lip to extend downwardly, and a lower L-shaped lip to extend upwardly allowing the lower L-shaped lip to engage the upper L shaped lip of an adjacent mat, forming a lip lock.

The extended portions can be alternating structural boards. All the extended portions can extend at the same distance forming corresponding opening in the opposite ends. Onto these extended portions, a lip edge can be created.

In another embodiment, the assembly can use from about 0.01 percent to about 3 percent by weight of the total weight, of a non-caustic soda with the ground plastic particles to prevent curling of the boards.

This non-caustic soda can be baking soda, and can be used to prevent curling of the boards in temperatures below 45 degrees Fahrenheit.

Turning now to the Figures, FIG. 1 depicts a flow chart of an embodiment of the method.

The method can include making a plurality of static resistant structural boards by blending together ground particles of high density polyethylene particles, polyethylene terephthalate particles, styrene-butadiene rubber particles, and antistatic particles for preventing static charge buildup, an ultraviolet stabilizer material, or combinations thereof, as illustrated by box 100.

In one or more embodiments, the ground particles that can be blended together can include: from about 50 percent by weight to about 92 percent by weight of high density polyethylene particles, polyethylene terephthalate particles, or combinations thereof; from about 0.5 percent by weight to about 3.9 percent by weight of styrene-butadiene rubber particles; from about 2 percent by weight to about 10 percent by weight of antistatic particles for preventing static charge buildup; and from about 0.5 percent by weight to about 5 percent by weight of an ultraviolet stabilizer material. The weight percentages of each ground particle can be based on a total blend of the ground particles.

The method can include heating and mixing the blended ground particles until the blended ground particles are extrudable into static resistant structural boards, as illustrated by box 104.

For example, the blended ground particles can be heated and mixed in an extruder for at a temperature ranging from about 200 degrees Fahrenheit to about 385 degrees Fahrenheit.

The antistatic particles partially protrude through an outer surface of the static resistant structural boards.

The method can include cooling the plurality of coated static resistant structural boards, as illustrated by box 105.

The method can include the step of at least partially coating the static resistant structural board with a slip resistant material while the static resistant structural board cools between about 10 degrees Fahrenheit to about 30 degrees Fahrenheit forming a partially slip resistant coated static resistant structural board with integral slip resistant material, as illustrated in box 106.

The slip resistant material can be carbon fiber homogenously mixed into and protruding partially through the outer surface of each static resistant structural boards, as illustrated by box 107.

The slip resistance can be imparted to the static resistant structural board by forming as a non-slip feature, a 30 to 45 degree bevel on each of the boards.

The slip resistance can be imparted to the static resistant structural boards by forming at least one groove longitudinally in each board with a depth from about ⅛ of an inch to about 3/16 of an inch and about ½ of an inch wide, as illustrated by box 108.

The method can include positioning a portion of the plurality of now partially slip resistant static resistant structural boards in a first orientation in parallel to each other as bottom structural boards, as illustrated by box 110.

The method can include positioning the bottom structural boards so that alternating bottom structural boards extend beyond adjacent bottom structural boards, as illustrated by box 112.

In embodiments, all of the extending bottom structural boards can extend beyond adjacent bottom structural boards by the same amount, forming corresponding openings on an opposite end.

The method can include positioning a portion of the plurality of static resistant structural boards as middle structural boards in a second orientation over the bottom structural boards, as illustrated by box 114.

The middle structural boards can be positioned in parallel to each other and at about a 90 degree angle to the bottom structural boards. The middle structural boards can be positioned such that they are not positioned over the extending bottom structural boards.

The method can include positioning a portion of the static resistant structural boards as top structural boards parallel to each other and can be spaced apart a distance that is flush, meaning the boards are touching each other longitudinally, to a distance of about ¾ of an inch apart.

The top boards can be positioned in the first orientation over the middle structural boards, forming a modular, antistatic, and interlocking assembly, as illustrated by box 116.

The top structural boards can be disposed at about a 90 degree angle to the middle structural boards and in parallel to each other.

The modular, antistatic, interlocking mat assembly is created with a perimeter such that the mat can fit on a conventional flatbed truck for transport over roads. The modular, antistatic, interlocking assembly can connect the mats without the need for tools.

The method can include securing the top structural boards, the middle structural boards, and the bottom structural boards together using an electrically conductive securing means, such as lag screws and bolts, and causing the electrically conductive securing means to at least partially extend from the top structural boards into the bottom structural boards, forming a static charge conduit through the modular, antistatic, non-skid, interlocking assembly to a ground, as illustrated by box 118.

For example, the electrically conductive securing means can create up to 20 conduits per boards. The lag screws can at least partially extend from the top structural boards into the bottom structural boards in an embodiment.

Use of the electrically conductive securing means to secure the top structural boards, the middle structural boards, and the bottom structural boards together can form a static resistant synthetic inter-connectable structural mat.

The static resistant synthetic inter-connectable structural mat can support vehicles, heavy equipment, drilling rigs, and the like. The static resistant synthetic inter-connectable structural mat can have static charge resistance and resistance to corrosive materials.

Figure 2:
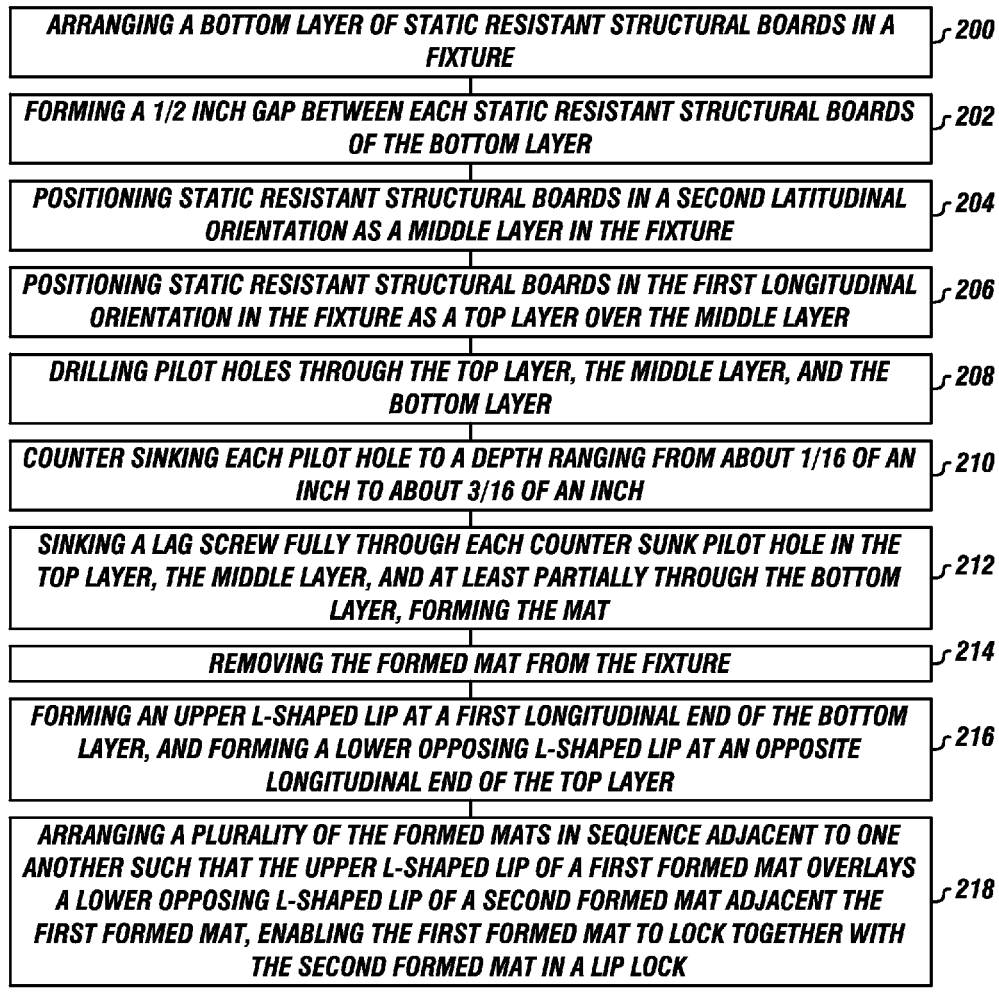
FIG. 2 is a flow chart of another embodiment of the method.

FIG. 2 depicts a flow chart of another embodiment of the method.

The method can include arranging a bottom layer of static resistant structural boards in a fixture, as illustrated by box 200.

Each static resistant structural board can be from about 10 feet to about 14 feet wide and long. From about 9 static resistant structural boards to about 12 static resistant structural boards can be arranged in a parallel orientation as the bottom layer.

The method can include forming a ½ inch gap between each static resistant structural boards of the bottom layer, as illustrated by box 202.

In embodiments, static resistant structural boards of the bottom layer can be placed in the fixture in a first longitudinal orientation, with three alternating static resistant structural boards of the bottom layer positioned to extend at least 12 inches from a perimeter of the bottom layer. The three alternating static resistant structural boards of the bottom layer can provide a male mating portion for the bottom layer, while simultaneously providing a female mating portion of the bottom layer for engagement with additional mats.

The method can include positioning static resistant structural boards in a second latitudinal orientation as a middle layer in the fixture, as illustrated by box 204.

The static resistant structural boards of the middle layer can be positioned at about a 90 degree angle to the first longitudinal orientation of the bottom layer. The static resistant structural boards of the middle layer can be disposed parallel to each other.

In one or more embodiments, the middle layer can include from about 15 static resistant structural boards to about 20 static resistant structural boards.

The method can include positioning static resistant structural boards in the first longitudinal orientation in the fixture as a top layer over the middle layer, as illustrated by box 206.

From about 9 static resistant structural boards to about 14 static resistant structural boards can be used as the top layer. The static resistant structural boards of the top layer can be positioned in parallel to each other.

The method can include drilling pilot holes through the top layer, the middle layer, and the bottom layer, as illustrated by box 208.

The pilot holes can have a diameter ranging from about ⅛ of an inch to about ¼ of an inch.

The method can include counter sinking each pilot hole to a depth ranging from about 1/16 of an inch to about 3/16 of an inch, as illustrated by box 210.

The method can include installing lag screws fully through each counter sunk pilot hole in the top layer, the middle layer, and at least partially through the bottom layer, forming the mat, as illustrated by box 212.

The method can include removing the formed mat from the fixture, as illustrated by box 214.

The method can include forming an upper L-shaped lip at a first longitudinal end of the bottom layer, and forming a lower opposing L-shaped lip at an opposite longitudinal end of the top layer, as illustrated by box 216.

The method can include arranging a plurality of the formed mats in sequence adjacent to one another such that the upper L-shaped lip of a first formed mat overlays a lower opposing L-shaped lip of a second formed mat adjacent the first formed mat, enabling the first formed mat to lock together with the second formed mat, in a lip lock as illustrated by box 218.

Figure 3:
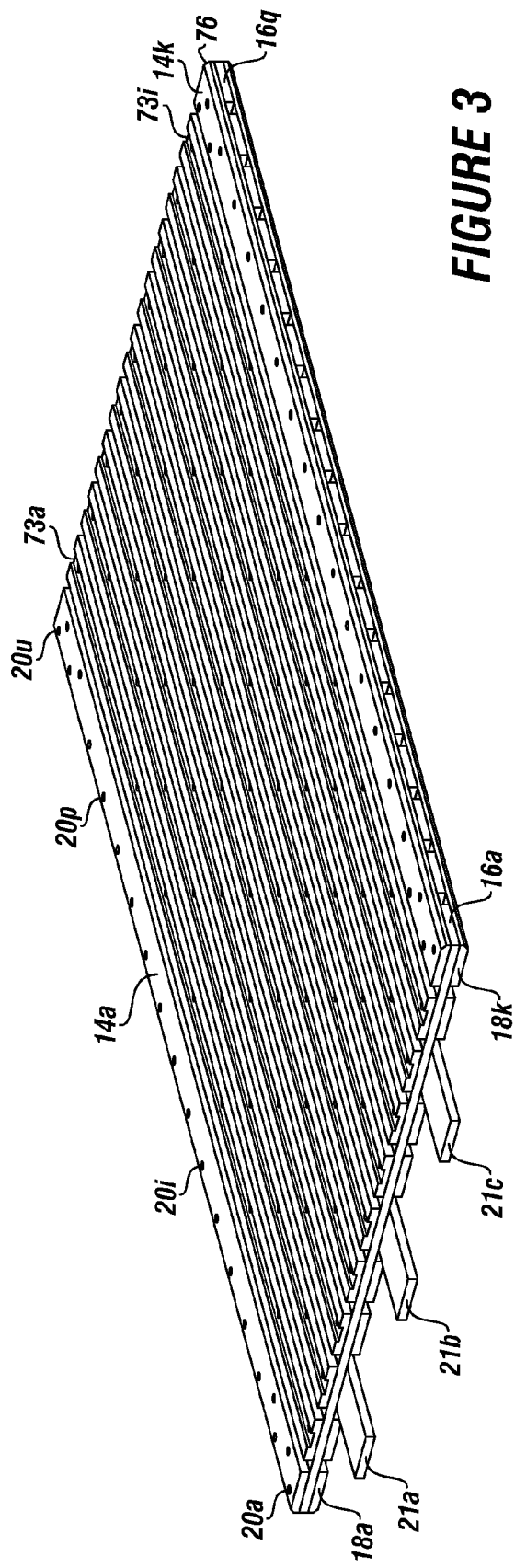
FIG. 3 is an embodiment of a mat made by the method of FIG. 1.

FIG. 3 is a top perspective view of an assembled three-layered mat, which can be made by the method of FIG. 1.

The mats made by the method of FIG. 1 can each be constructed forming a top layer from a plurality of top layer structural boards 14a-14k, forming a middle layer from a plurality of middle layer structural boards 16a-16q and forming a bottom layer from a plurality of bottom layer structural boards 18a-18k. The top layer is shown connected to the middle layer and bottom layers with a plurality of lag screws and bolts 20a-20u.

These structural boards can be made from an extruded blend of ground particles which can comprise: (i) 90 percent by weight based on the total blend of ground plastic particles of high density polyethylene particles; and polyethylene terephthalate particles, or combinations thereof; (ii) 2 percent by weight based on the total blend of crumb rubber, which can be 100 percent ground styrene-butadiene rubber particles; (iii) 2 percent by weight based on the total blend of antistatic particles for preventing static charge buildup; (iv) 5 percent by weight based on the total blend of an ultraviolet stabilizer material, then placing the blend of ground particles into an extruder for heating and mixing using a temperature from about 200 degrees Fahrenheit to about 385 degrees Fahrenheit until the blend of ground particles are extrudable into a static resistant structural board; wherein the antistatic material partially protrudes through an outer surface of the static resistant structural board; coating the static resistant structural board while the board is at a temperature from about 200 degrees Fahrenheit to about 385 degrees Fahrenheit; (v) and 1 percent by weight of a slip resistant material forming the static resistant structural board.

In an embodiment, one or more grooves 73a-73i can be formed longitudinally in the extrudate as seen in FIG. 3. A 30 to 45 degree bevel 76 can also be formed on the boards for slip resistance.

In an embodiment, only these ingredients can be used in the formulation to provide structural boards with high strength, high load support, such as to about 5000 pounds per square foot, when the formulation is about 2 inches thick.

Additionally in this embodiment the formed structural boards have a resistance to toxic substances, such as oil, and essentially zero porosity to resist collection of water or other toxic materials at a drill site.

The antistatic material can be blended in the formulation and can create various random particle connections with other antistatic particles to facilitate dissipation of static charge build up in the structural boards, and creating a density of at least 10 particles per square inch.

In this Figure, the extended portions 21a, 21b, and 21c of three of the plurality of bottom layer structural boards are depicted. The extended portions form corresponding holes in the opposite end of the formed mat.

Figure 4:
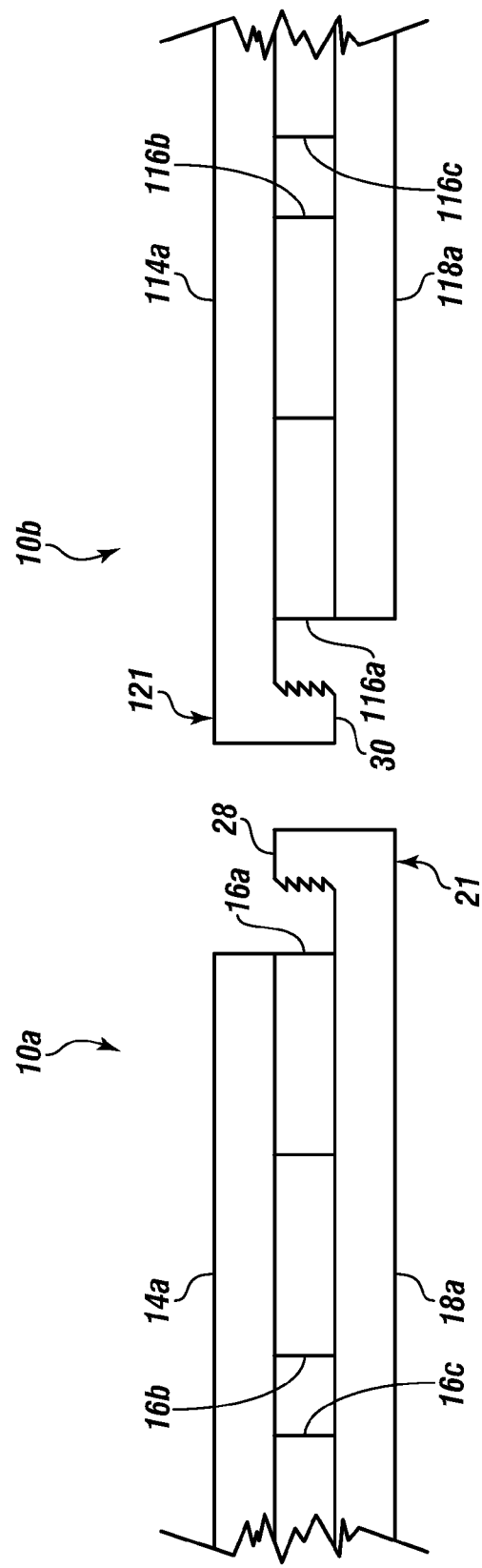
FIG. 4 is an embodiment of a mat made by the method of FIG. 2.

FIG. 4 shows an embodiment of a mat made by the method of FIG. 2, with the bottom layer structural board 18a of a first mat 10a depicted with a bottom layer extended portion 21 having a bottom lip 28 that extends toward the top layer structural board 114a of an adjacent or second mat 10b The first mat 10a is shown in this Figure with a top layer structural board 14a, middle layer structural boards 16a, 16b and 16c and a bottom layer structural board 18a The second mat 10b is shown in this figure with a top layer structural board 114a, middle layer structural boards 116a, 116b and 116c and a bottom layer structural board 118a.

Each bottom lip can be the width of the bottom layer structural board, and have a length from about 3 inches to about 14 inches, and a height from the bottom layer structural board from about 1 inches to about 7 inches.

The top layer structural board 114a of an adjacent or second mat 10b is shown having top extended portion 121 having a top lip 30, which can have a different size than the bottom lip. In another embodiment, the top lip can have the same size and characteristics as the bottom lip. The top lip 30 can be mounted in a downward positioning facing the bottom layer structural board 18a.

The top lip and the bottom lip in an embodiment can be installed on the top and bottom boards while the boards are still warm, and then additionally held in place with lag screws and bolts, allowing the lip to have a seamless integration into the boards.

Examples of various specific formulations of the structural boards follow:

Example 1

The ground blend consists of 91 percent by weight based on the total blend of ground plastic particles, of which 40 percent is high density polyethylene particles and 60 percent is polyethylene terephthalate particles; (ii) 3 percent by weight based on the total blend of ground styrene-butadiene rubber particles; (iii) 2 percent by weight based on the total blend of an antistatic particles for preventing static charge buildup, wherein the antistatic particles have a diameter from about 1/8 of an inch to about 1/4 of an inch to allow for partial protrusion through a formed outer surface and randomized particle connections with each other to facilitate dissipation of static charge buildup in the structural boards, and creating a density of at least 10 particles per square inch.

To the plastic particles are also added 3 percent by weight based on the total blend of an ultraviolet stabilizer material; and 1 percent by weight based on the total weight of the blend of a slip resistant coating.

Example 2

The ground blend consists of 91 percent by weight based on the total blend of ground plastic particles which are 60 percent high density polyethylene particles; and 40 percent polyethylene terephthalate particles; 2 percent by weight based on the total blend of ground styrene-butadiene rubber particles; 4 percent by weight based on the total blend of antistatic particles for preventing static charge buildup, wherein the antistatic particles have a diameter from about 1/8 of an inch to about 1/4 of an inch to allow for partial protrusion through a formed outer surface.

It can be noted that the antistatic particles are blended during mixing creating randomized particle connections with each other to facilitate dissipation of static charge buildup in the structural boards, and creating a density of at least 10 particles per square inch.

In this example, there is also added to the plastic particles 1.5 percent by weight based on the total blend of an ultraviolet stabilizer material; and 1.5 percent by weight based on the total weight of the blend of a slip resistant material, such as nylon or EVA or combinations thereof.

Example 3

The ground blend consists of 79.5 percent by weight based on the total blend of ground plastic particles having 10 percent high density polyethylene particles; and 90 percent polyethylene terephthalate particles; (ii) 3.5 percent by weight based on the total blend of ground styrene-butadiene rubber particles; (iii) 10 percent by weight based on the total blend of an antistatic particles for preventing static charge buildup, wherein the antistatic particles have a diameter from about 1/8 of an inch to about 1/4 of an inch to allow for partial protrusion through a formed outer surface and randomized particle connections with each other to facilitate dissipation of static charge buildup in the structural boards, and creating a density of at least 10 particles per square inch.

To the plastic particles is also added 4 percent by weight based on the total blend of an ultraviolet stabilizer material; and 3 percent by weight based on the total weight of the blend of a nylon slip resistant material.

To all of these examples, can be added from 0.01 percent by weight to 3.0 percent by weight of the total weight, of a non-caustic soda with the ground plastic particles to prevent curling. The non-caustic soda can be baking soda. The non-caustic soda prevents curling from temperature variations from the temperatures of materials on the mat to the outside temperatures.

In another embodiment it can be noted that using 4 and 1/2 inch lag screws provide a highly conductive conduit in forming the mats.

In another embodiment, the method can include the step of colorizing the boards based on content of plastic or crumb rubber in the boards, to distinguish arctic boards from temperate climate boards, to distinguish between boards that support loads of 1 ton to loads of 5 tons.

Example 4

A black structural board might use 1000 pounds of colored high density polyethylene which is post consumer, with 35 pounds of shredded recycled rubber plus 1/4 pounds of sodium bicarbonate (to prevent curling) with 1 pound of black colorant plus ultraviolet (UV) stabilizer plus antistatic material.

Example 5

A black structural board might use 1000 pounds of colored high density polyethylene which is post consumer, with 35 pounds of shredded recycled rubber plus 1/4 pounds of sodium bicarbonate (to prevent curling) with 1 pound of black colorant plus antistatic material.

Example 6

A green structural board might use 1000 pounds of colored high density polyethylene which is post consumer, with 35 pounds of shredded recycled rubber plus 1/4 pounds of sodium bicarbonate (to prevent curling) with 2 pounds of green colorant plus UV stabilizer, plus antistatic material.

Example 7

In this example, ground plastic particles made of 15 percent by weight high density polyethylene is used with 72 percent by weight low density polyethylene and 5 percent by weight polyethylene terephthalate 1/2 percent by weight of ground rubber particulates can then be added which solely consist of post consumer shredded tires of styrene-butadiene rubber.

To these components are added 1/2 percent by weight baking soda, and 5 percent by weight slip resistant material made up of 2.5 percent by weight polyamide (a nylon 6), with 2 and 1/2 percent by weight ethyl vinyl acetate and 1/2 percent by weight of an antistatic material consisting essentially of carbon black.

While these embodiments have been described with emphasis on the embodiments, it should be understood that within the scope of the appended claims, the embodiments might be practiced other than as specifically described herein.

What is claimed is:

1. A method of producing a static resistant synthetic inter-connectable structural mat for supporting vehicles, heavy equipment, and drilling rigs, and for resisting static charge and corrosive materials, wherein the static resistant synthetic inter-connectable structural mat is transportable using conventional trucks on conventional roadways, the method comprises:
   a. positioning a plurality of static resistant structural boards parallel to each other and spaced from ¼ of an inch to ¾ of an inch apart, as bottom structural boards in a first orientation, and extending alternating bottom structural boards to extend beyond an adjacent bottom structural board, forming a plurality of identical length openings between adjacent bottom structural boards opposite the extended bottom structural boards;
   b. positioning a plurality of static resistant structural boards parallel to each other and spaced from ¼ of an inch to ¾ of an inch apart, as middle structural boards in a second orientation over the bottom structural boards, wherein the second orientation is at a 90 degree angle to the first orientation, and wherein the middle structural boards do not extend over the extending bottom structural boards;
   c. positioning a plurality of static resistant structural boards parallel to each other and spaced from flush to each other to ¾ of an inch apart, as top structural boards in the first orientation over the middle structural boards, wherein the top structural boards do not extend over the extending bottom structural boards; and
   d. securing the top structural boards and the middle structural boards to the bottom structural boards using lag screws providing a static charge conduit from each top structural board to a ground, thereby forming a static resistant synthetic inter-connectable structural mat, wherein each of the bottom layer of structural boards, the middle layer of structural boards, and the top layer of structural boards are formed by the method:
      (i) creating a blend of ground particles, comprising:
         1. from 50 percent by weight to 92 percent by weight based on the total blend of ground plastic particles, further comprising:
            a. polyethylene particles;
            b. polyethylene terephthalate particles; and
            c. combinations thereof in a ratio from 1:10 to 10:1;
         2. from 0.5 percent by weight to about 3.9 percent by weight based on the total blend of ground styrene-butadiene rubber particles;
         3. from 2 percent by weight to 10 percent by weight based on the total blend of antistatic particles for preventing static charge buildup, wherein the antistatic particles at least partially protrude through a formed outer surface; and wherein randomized antistatic particles are connected with each other to facilitate dissipation of static charge build in the structural boards, and create a density of at least 10 antistatic particles per square inch; and
            4. from 0.5 percent by weight to 5 percent by weight based on the total blend of an ultraviolet stabilizer material;
      (ii) heating and mixing the blend of ground particles using a temperature from 200 degrees Fahrenheit to and 385 degrees Fahrenheit and extruding to form a static resistant structural board; and
      (iii) cooling the static resistant structural board to an ambient temperature; and
   wherein the antistatic particles are a dissipater preventing static electrical buildup and maintaining voltage dissipation at or below $10^{-11}$ volts.

2. The method of claim 1, wherein the cooling is performed using an aqueous bath.

3. The method of claim 1, wherein the static resistant structural board is from 7 feet 11 inches to 12 feet long.

4. The method of claim 1, further comprising the step of at least partially coating the static resistant structural board with a slip resistant material while the static resistant structural board cools forming a partially slip resistant coated static resistant structural board with integral slip resistant material, wherein the thickness of the slip resistant coating ranges from ¹⁄₁₆ of an inch to ³⁄₁₆ of an inch, and wherein the slip resistant coating comprises from 0.01 percent by weight to 6 percent by weight of the total weight of the partially slip resistant coated static resistant structural board.

5. The method of claim 4, wherein the slip resistant material is a member of the group consisting of: a silica based material, a crumb rubber, a polyamide blended with ethyl vinyl acetate in equal amounts, and combinations thereof.

6. The method of claim 1, further comprising forming a groove longitudinally in each structural board with a depth from ⅛ of an inch to ³⁄₁₆ of an inch and from ½ of an inch to ¾ of an inch wide.

7. The method of claim 1, further comprising forming as a non-slip feature, a 30 to 45 degree bevel on each of the structural boards.

8. The method of claim 1, wherein the ground plastic particles, the ground styrene-butadiene rubber particles, and the ultraviolet stabilizer material have diameters ranging from ¹⁄₁₆ of an inch to ¼ of an inch.

9. The method of claim 1, further comprising using from 0.01 percent by weight to 3 percent by weight of the total weight, of a non-caustic soda with the ground plastic particles to prevent curling at temperatures less than 45 degrees Fahrenheit.

10. A method of producing a static resistant synthetic inter-connectable structural mat for supporting vehicles, heavy equipment, and drilling rigs, and for resisting static charge and corrosive materials, wherein the static resistant synthetic inter-connectable structural mat is transportable using conventional trucks on conventional roadways, the method comprises:
   a. positioning a plurality of static resistant structural boards parallel to each other and spaced from ¼ of an inch to ¾ of an inch apart, as bottom structural boards in a first orientation, and extending alternating bottom structural boards to extend beyond an adjacent bottom structural board, forming a plurality of identical length openings between adjacent bottom structural boards opposite the extended bottom structural boards;
   b. positioning a plurality of static resistant structural boards parallel to each other and spaced from ¼ of an inch to ¾ of an inch apart, as middle structural boards in a second orientation over the bottom structural boards, wherein the second orientation is at a 90 degree angle to the first orientation, and wherein the middle structural boards do not extend over the extending bottom structural boards;
   c. positioning a plurality of static resistant structural boards parallel to each other and spaced from flush to each other to ¾ of an inch apart, as top structural boards in the first orientation over the middle structural boards, wherein the top structural boards do not extend over the extending bottom structural boards; and
   d. securing the top structural boards and the middle structural boards to the bottom structural boards using lag screws providing a static charge conduit from each top structural board to a ground, thereby forming a static resistant synthetic inter-connectable structural mat, wherein each of the bottom layer of structural boards, the middle layer of structural boards, and the top layer of structural boards are formed by the method:
   (i) creating a blend of ground particles, comprising:
      1. from 50 percent by weight to 92 percent by weight based on the total blend of ground plastic particles, further comprising:
         a. polyethylene particles;
         b. polyethylene terephthalate particles; and
         c. combinations thereof in a ratio from 1:10 to 10:1;
      2. from 0.5 percent by weight to about 3.9 percent by weight based on the total blend of ground styrene-butadiene rubber particles;
      3. from 2 percent by weight to 10 percent by weight based on the total blend of antistatic particles for preventing static charge buildup, wherein the antistatic particles at least partially protrude through a formed outer surface; and wherein randomized antistatic particles are connected with each other to facilitate dissipation of static charge build in the structural boards, and create a density of at least 10 antistatic particles per square inch; and
      4. from 0.5 percent by weight to 5 percent by weight based on the total blend of an ultraviolet stabilizer material;
   (ii) heating and mixing the blend of ground particles using a temperature from 200 degrees Fahrenheit to and 385 degrees Fahrenheit and extruding to form a static resistant structural board;
   (iii) cooling the static resistant structural board to an ambient temperature; and
   (iv) coating the static resistant structural board at least partially with a slip resistant material while the static resistant structural board cools forming a partially slip resistant coated static resistant structural board with integral slip resistant material, wherein the thickness of the slip resistant coating ranges from 1/16 of an inch to 3/16 of an inch, and wherein the slip resistant coating comprises from 0.01 percent by weight to 6 percent by weight of the total weight of the partially slip resistant coated static resistant structural board.

11. The method of claim 10, wherein the cooling is performed using an aqueous bath.

12. The method of claim 10, wherein the slip resistant material is a member of the group consisting of: a silica based material, a crumb rubber, a polyamide blended with ethyl vinyl acetate in equal amounts, and combinations thereof.

13. A method of producing a static resistant synthetic inter-connectable structural mat for supporting vehicles, heavy equipment, and drilling rigs, and for resisting static charge and corrosive materials, wherein the static resistant synthetic inter-connectable structural mat is transportable using conventional trucks on conventional roadways, the method comprises:
   a. positioning a plurality of static resistant structural boards parallel to each other and spaced from 1/4 of an inch to 3/4 of an inch apart, as bottom structural boards in a first orientation, and extending alternating bottom structural boards to extend beyond an adjacent bottom structural board, forming a plurality of identical length openings between adjacent bottom structural boards opposite the extended bottom structural boards;
   b. positioning a plurality of static resistant structural boards parallel to each other and spaced from 1/4 of an inch to 3/4 of an inch apart, as middle structural boards in a second orientation over the bottom structural boards, wherein the second orientation is at a 90 degree angle to the first orientation, and wherein the middle structural boards do not extend over the extending bottom structural boards;
   c. positioning a plurality of static resistant structural boards parallel to each other and spaced from flush to each other to 3/4 of an inch apart, as top structural boards in the first orientation over the middle structural boards, wherein the top structural boards do not extend over the extending bottom structural boards; and
   d. securing the top structural boards and the middle structural boards to the bottom structural boards using lag screws providing a static charge conduit from each top structural board to a ground, thereby forming a static resistant synthetic inter-connectable structural mat, wherein each of the bottom layer of structural boards, the middle layer of structural boards, and the top layer of structural boards are formed by the method:
      (i) creating a blend of ground particles, comprising:
         1. from 50 percent by weight to 92 percent by weight based on the total blend of ground plastic particles, further comprising:
            a. polyethylene particles;
            b. polyethylene terephthalate particles; and
            c. combinations thereof in a ratio from 1:10 to 10:1;
         2. from 0.5 percent by weight to about 3.9 percent by weight based on the total blend of ground styrene-butadiene rubber particles;
         3. from 2 percent by weight to 10 percent by weight based on the total blend of antistatic particles for preventing static charge buildup, wherein the antistatic particles at least partially protrude through a formed outer surface; and wherein randomized antistatic particles are connected with each other to facilitate dissipation of static charge build in the structural boards, and create a density of at least 10 antistatic particles per square inch; and
         4. from 0.5 percent by weight to 5 percent by weight based on the total blend of an ultraviolet stabilizer material;
      (ii) heating and mixing the blend of ground particles using a temperature from 200 degrees Fahrenheit to and 385 degrees Fahrenheit and extruding to form a static resistant structural board;
      (iii) cooling the static resistant structural board to an ambient temperature; and
         wherein the ground plastic particles, the ground styrene-butadiene rubber particles, and the ultraviolet stabilizer material have diameters ranging from 1/16 of an inch to 1/4 of an inch.

14. The method of claim 13, wherein the cooling is performed using an aqueous bath.

15. A method of producing a static resistant synthetic inter-connectable structural mat for supporting vehicles, heavy equipment, and drilling rigs, and for resisting static charge and corrosive materials, wherein the static resistant synthetic inter-connectable structural mat is transportable using conventional trucks on conventional roadways, the method comprises:
   a. positioning a plurality of static resistant structural boards parallel to each other and spaced from 1/4 of an inch to 3/4 of an inch apart, as bottom structural boards in a first orientation, and extending alternating bottom structural boards to extend beyond an adjacent bottom structural board, forming a plurality of identical length openings between adjacent bottom structural boards opposite the extended bottom structural boards;

b. positioning a plurality of static resistant structural boards parallel to each other and spaced from ¼ of an inch to ¾ of an inch apart, as middle structural boards in a second orientation over the bottom structural boards, wherein the second orientation is at a 90 degree angle to the first orientation, and wherein the middle structural boards do not extend over the extending bottom structural boards;

c. positioning a plurality of static resistant structural boards parallel to each other and spaced from flush to each other to ¾ of an inch apart, as top structural boards in the first orientation over the middle structural boards, wherein the top structural boards do not extend over the extending bottom structural boards; and d. securing the top structural boards and the middle structural boards to the bottom structural boards using lag screws providing a static charge conduit from each top structural board to a ground, thereby forming a static resistant synthetic inter-connectable structural mat, wherein each of the bottom layer of structural boards, the middle layer of structural boards, and the top layer of structural boards are formed by the method:

(i) creating a blend of ground particles, comprising:
1. from 50 percent by weight to 92 percent by weight based on the total blend of ground plastic particles, further comprising:
   a. polyethylene particles;
   b. polyethylene terephthalate particles; and
   c. combinations thereof in a ratio from 1:10 to 10:1;
2. from 0.5 percent by weight to about 3.9 percent by weight based on the total blend of ground styrene-butadiene rubber particles;
3. from 2 percent by weight to 10 percent by weight based on the total blend of antistatic particles for preventing static charge buildup, wherein the antistatic particles at least partially protrude through a formed outer surface; and wherein randomized antistatic particles are connected with each other to facilitate dissipation of static charge build in the structural boards, and create a density of at least 10 antistatic particles per square inch;
4. from 0.5 percent by weight to 5 percent by weight based on the total blend of an ultraviolet stabilizer material; and
5. from 0.01 percent by weight to 3 percent by weight based on the total blend of a non-caustic soda with the ground plastic particles to prevent curling at temperatures less than 45 degrees Fahrenheit;

(ii) heating and mixing the blend of ground particles using a temperature from 200 degrees Fahrenheit to and 385 degrees Fahrenheit and extruding to form a static resistant structural board; and (iii) cooling the static resistant structural board to an ambient temperature.

16. The method of claim 15, wherein the cooling is performed using an aqueous bath.

* * * * *